(12) United States Patent
Haupt et al.

(10) Patent No.: US 6,798,720 B2
(45) Date of Patent: Sep. 28, 2004

(54) PROJECTION ALARM CLOCK

(76) Inventors: Rolf Wilhelm Haupt, Unit A3, 12/Fl., Kailey Ind. Ctr., No. 12 Fung Yip St., Chalwan (HK); Fritz Schäffel, Karl-Laisner-Strasse 5, D-86386 Eching (DE)

( * ) Notice: Subject to any disclaimer, the term of this patent is extended or adjusted under 35 U.S.C. 154(b) by 0 days.

(21) Appl. No.: 10/138,515

(22) Filed: May 6, 2002

(65) Prior Publication Data

US 2003/0206494 A1 Nov. 6, 2003

(30) Foreign Application Priority Data

May 16, 2001 (DE) ..................................... 201 08 223 U
Apr. 19, 2002 (DE) .......................................... 102 17 516

(51) Int. Cl.[7] .................. G04C 19/00; G04B 19/00; G04B 47/00
(52) U.S. Cl. ..................... 368/79; 368/10; 368/72; 368/82
(58) Field of Search ................. 368/79, 10–11, 368/72–73, 76, 82–84, 109, 111

(56) References Cited

U.S. PATENT DOCUMENTS

| | | | | |
|---|---|---|---|---|
| 3,136,210 A | * | 6/1964 | Barrett | 368/79 |
| 4,461,581 A | * | 7/1984 | Simon | 368/79 |
| 5,247,492 A | * | 9/1993 | Pan | 368/79 |
| 5,625,489 A | * | 4/1997 | Glenn | 359/455 |
| 5,926,440 A | * | 7/1999 | Chien | 368/10 |
| 6,236,622 B1 | * | 5/2001 | Blackman | 368/10 |
| 6,323,999 B1 | * | 11/2001 | Ueda et al. | 359/443 |
| 6,483,643 B1 | * | 11/2002 | Zuchowski | 359/443 |

* cited by examiner

Primary Examiner—David Martin
Assistant Examiner—Michael L Lindinger
(74) Attorney, Agent, or Firm—Hoffman, Wasson & Gitler, P.C.

(57) ABSTRACT

The invention relates to a novel design for a projection alarm clock for displaying various values by means of projection, using a projector with one optical unit and one optoelectrical unit for producing the images of the data to be projected.

6 Claims, 1 Drawing Sheet

PROJECTION ALARM CLOCK

BACKGROUND OF THE INVENTION

The invention relates to a projection alarm clock. Projection alarm clock in accordance with the present invention refers to an apparatus that can be used to project various values, data or images representing this data, onto one common or onto several projection surfaces for example, in particular the time, date, alarm time, inside temperature, outside temperature, humidity and weather images or symbols for displaying the weather forecast or tendency.

The object of the invention is to present a projection alarm clock that is characterized by a particularly simply yet reliable design. To achieve this object, a projection alarm clock for displaying various values by means of projection.

SUMMARY OF THE INVENTION

A projector is provided with an optical unit and an optoelectrical unit for producing the images of the data projected. The optoelectrical unit allows the image to be projected in various axis or projection directions.

BRIEF DESCRIPTION OF THE FIGURE

The invention is described below based on the drawing:

Depicted is a projection alarm clock according to the invention in a simplified diagram of the functions.

DETAILED DESCRIPTION OF THE INVENTION

Figure 1:
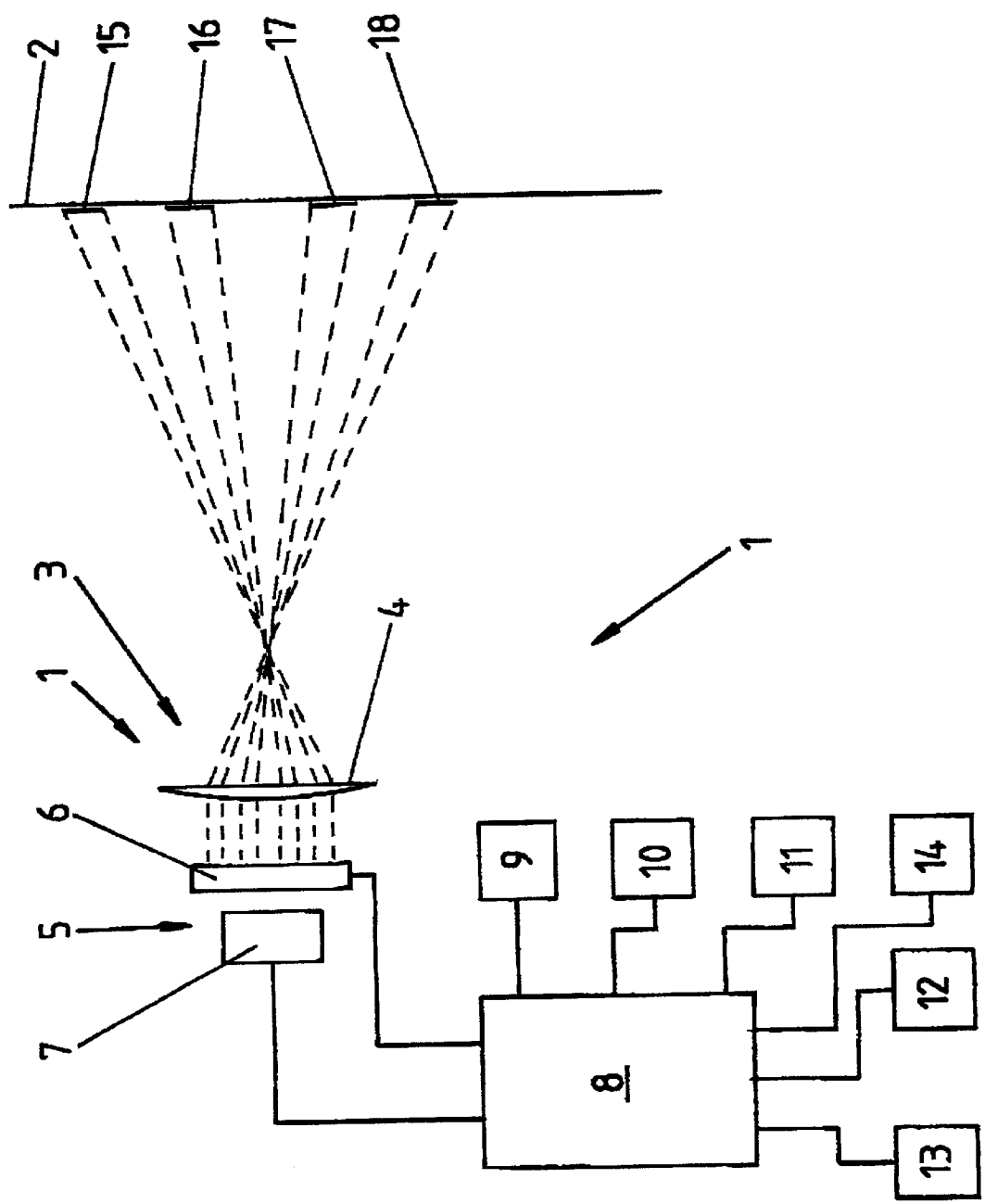

The projection alarm clock represented in the drawing displays the time, the current date, the alarm time, the inside temperature, the outside temperature and the humidity (hygrometer function), in addition to a weather forecast in the form of weather images, in each case by means of projections on a suitable projection surface 2, for example an interior wall of a building, the surface of an item of furniture etc. The projection surface 2 can, in principal, have the form of frosted glass.

In order to display the above-named values, there is a projector unit 3, which includes an optical projection system 4, which in the simplest form is made of a lens, and an optoelectrical unit, which, triggered by corresponding control signals, produces the optical images to be displayed on the projection surface 2. In the depicted embodiment, the optoelectrical unit 5 has at least one LCD 6 with at least one LED 7 as a light source.

For the control of the optoelectrical unit 5 there is, for example, a control unit 8 with, for example, one microprocessor with accompanying memory and which is allocated the following additional functional elements:

| clock 9 with alarm function, | hygrometer 12 |
|---|---|
| outside temperature sensor 10, | barometer 13 |
| inside temperature sensor 11, | input unit 14. |

The above functions can also be partially realized by software in the control unit 8, for example, the clock and alarm function 9.

A special feature of the projection alarm clock 1 is that several values or data items can be displayed simultaneously on the projection surface 2, as indicated by the surfaces 15–18 in the drawing, for example, the time/alarm time, the date, the inside/outside temperature and the humidity/weather symbols, e.g. for a weather forecast.

The projection unit 3 and in particular also the optical unit 5 are designed such that the values 15–18 are projected in different axis directions, so that these values are simultaneously displayed next to each other on the projection surface 2.

The embodiment according to the invention avoids projectors or rotatable components of such projectors, so that the projection alarm clock 1 is characterized by a particularly simple and also reliable construction.

The light source, which is likewise controlled by the control unit 8, is preferably a multi-color LED, so that by corresponding input at the input unit 14 it is possible to set the color of the values, data or images displayed by means of projection. Furthermore, the intensity of the LED that makes up the light source 7 can be adjusted by pulse control via the input unit 14.

The invention was described above based on one sample embodiment. Of course, numerous modifications and variations are possible without abandoning the underlying inventive idea of the invention.

For example, it was assumed above that, in the areas 15–18, images are projected that correspond to only one value (time, date, alarm time, inside temperature, humidity, weather symbol etc.) to be displayed and that these images are projected onto a common projection surface 2. Of course, it is also possible that the individual images are projected to different projection surfaces or that several images are projected simultaneously (as a composite image) in different directions.

Reference Number List
1 projection alarm clock
2 projection surface
3 projection unit
4 optical unit
5 optoelectrical unit
6 LCD
7 light source (LED)
8 control unit
9 clock
10 inside temperature
11 outside temperature
12 hygrometer
13 barometer
14 input

What is claimed is:

1. A projection apparatus for a projection alarm clock for displaying various clock values by means of projection, comprising: a projector with one optical projection system; an optoelectrical unit for producing the images of the clock data to be projected; wherein the optoelectrical unit comprises at least one LCD displaying at least two images of the clock data, such that the at least two images created by the LCD are projected simultaneously in a different axis of projection to form a composite projected image.

2. The projection apparatus according to claim 1, wherein the optoelectrical unit is one LCD displaying all of the images of the data to be projected.

3. The projection apparatus according to claim 1, wherein the at least one LCD has at least one LED as a light source.

4. The projection apparatus according to claim 1, wherein one value is projected in each axis of projection.

5. The projection apparatus according to claim 1, wherein alight intensity or a color of the optoelectrical unit is adjustable.

6. The projection apparatus according to claim 1, wherein the LCD has at least one color-switchable or pulsed LED.

* * * * *